United States Patent
Davis

(10) Patent No.: US 6,226,134 B1
(45) Date of Patent: May 1, 2001

(54) ADJUSTABLE MONOCULAR EYE SHIELD FOR TELESCOPES AND SIMILAR INSTRUMENTS

(76) Inventor: Terry Lee Davis, 4525 S. Seymour Rd., Tucson, AZ (US) 85746

(*) Notice: Subject to any disclaimer, the term of this patent is extended or adjusted under 35 U.S.C. 154(b) by 0 days.

(21) Appl. No.: 09/498,359

(22) Filed: Feb. 4, 2000

(51) Int. Cl.[7] .............................. G02B 7/02; G02B 21/00
(52) U.S. Cl. ........................ 359/822; 359/84; 359/610
(58) Field of Search .................................. 359/822, 610, 359/611, 612, 600, 879, 811, 399, 404, 407, 368, 511; 351/45, 46; 396/448

(56) References Cited

U.S. PATENT DOCUMENTS

| | | | |
|---|---|---|---|
| 683,012 | * | 9/1901 | Hill ........................................ 359/610 |
| 4,729,648 | * | 3/1988 | Armstrong ........................... 359/610 |
| 6,088,174 | * | 7/2000 | Cox ....................................... 359/819 |

FOREIGN PATENT DOCUMENTS

401686486 * 7/1994 (JP) .............................. G02B/25/100

* cited by examiner

Primary Examiner—Georgia Epps
Assistant Examiner—Saeed Seyrafi

(57) ABSTRACT

The present invention relates to an adjustable monocular eye shield for use with telescopes and similar instruments. The invention prevents light from entering the retina of the eye not being used to view an image when installed and properly positioned on a telescope eyepiece or ocular. The invention is normally fitted over an eyepiece's barrel and includes a substantially enclosed optical mask proportioned such to block both the medial and peripheral vision in one of the users' eyes and prevent impinging light from entering the retina of the same eye. The adjustable monocular eye shield is readily adapted to different users' and types of telescopes. It is adjustable for changes in an eyepiece's focal length, the users' interpupillary dimension, telescope position and orientation about the X, Y and Z Cartesian axis, the users' head and eye position, for focus mechanism movement, is provisioned to allow adequate eyepiece relief and can be positioned to avoid interference with other ancillary optical components at or near the telescope's exit pupil position.

7 Claims, 4 Drawing Sheets

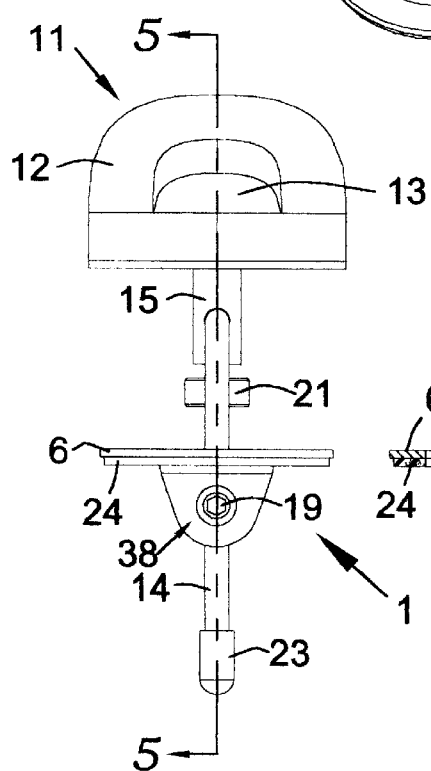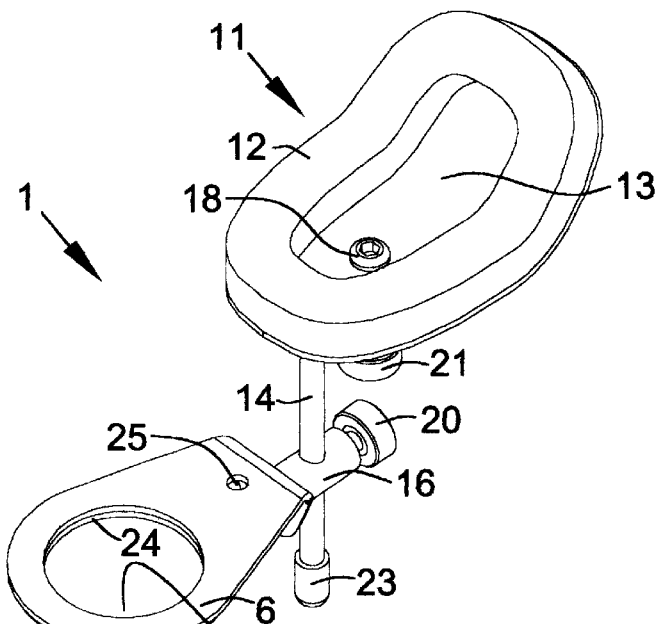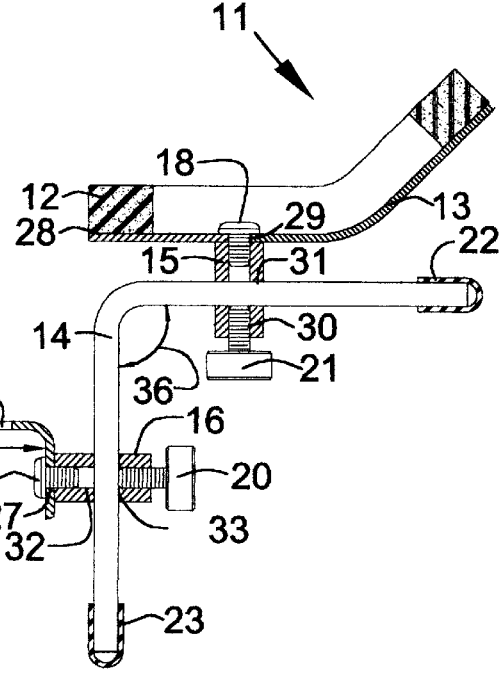
Fig. 3
Fig. 4
Fig. 5

ADJUSTABLE MONOCULAR EYE SHIELD FOR TELESCOPES AND SIMILAR INSTRUMENTS

BACKGROUND OF THE INVENTION

1. Field of the Invention

The present invention relates to an adjustable monocular eye shield for telescopes and similar instruments and in particular to optical masking or occluding devices for obstructing the field of view of one eye while the other eye is being used to view an image through an ocular or eyepiece. Often it is preferable to occlude the vision in one eye to prevent stereoscopic vision or binocular rivalry from occurring when viewing an image at the exit pupil of a monocular instrument. The term "monocular" as used herein, refers to optical instruments and similar devices having a single eyepiece or ocular designed for viewing an objective image.

The optical telescope in its rudimentary form was first introduced more than three centuries ago. One unique feature and characteristic of optical telescopes whether of the reflecting or refracting type, are that they employ a monocular or single eyepiece for viewing an image at the exit pupil. Telescopes and similar monocular optical instruments can usually be used with either the left or right eyes to view an objective image without particular encumbrances to the user. A subject of this invention is that when using a telescope this leaves one eye unoccupied or unused in viewing the image being produced or formed at the exit pupil or eyepiece.

One way the telescope user has addressed the problem of binocular vision is by either closing the eyelids surrounding one eye or by covering the eye with their hand when viewing an image through an ocular or eyepiece. This is often done to prevent impinging light from entering the retina of the eye not used to view an image through the eyepiece. Impinging light that is not masked can detract from the image being viewed in the ocular or eyepiece. An annoyance and a consequence often associated with either closing the eyelids of one eye or covering it with a hand during prolonged periods of viewing is muscle fatigue. Muscle fatigue can occur in muscles of the upper chest, back, shoulders, in the arms or the hand used to cover the eye, or in the periocular muscles of one either eye if the eyelids are closed. Additionally the visual impairments created by peripheral ocular muscle fatigue, discomfort and eye strain can often reduce the user's ability to focus an optical instrument accurately.

2. Description of the Related or Prior Art

A thorough description of the prior art in the field of this invention and in the related fields of retractable eye shields and optical occluding devices can be found in U.S. Pat. No. 4,810,078 to Armstrong (March 1989) and U.S. Pat. No. 4,824,235 to Eddy (April 1989). Of the known related or prior art inventions, only this unique and new innovation of an adjustable monocular eye shield includes a substantially enclosed optical mask, a multiple axis positioning mechanism with a cantilever arm and an eyepiece adapter bracket designed to be fitted over an eyepiece's barrel or tube as they are known in the art.

Eyepieces for small telescopes are commonly available in three standard sizes of 0.965, 1.250 and 2.000 inches. Standard size as it is known in the art refers to the outside diameter of the barrel or tube portion of an eyepiece. The barrel or tube is typically an internally threaded hollow cylinder that extends from the lens cell portion of an eyepiece and performs three basic functions. It is used optically to align the eyepiece lens at the exit pupil, its peripheral surface provides a setscrew platen for mechanically securing the eyepiece to an instrument and its internal threads can be used to attach a filter or similar device. The lens cell portion of an eyepiece holds and secures the lens and is generally larger in diameter than the barrel portion. Standardization of barrel or tube sizes within the industry allows eyepieces' to be easily interchanged among telescopes accepting the same nominal size eyepiece and it is a subject of this invention to find advantage in this similarity.

When using a telescope, positioning the eye at the telescope exit pupil or at the eyepiece is generally necessary to properly view or focus an objective image. Having to center the eye on the optical axis while focusing and maintaining proper eye relief has always been a significant limitation to fitting any telescope with a practical eye shield. A practical eye shield must readily adapt to changes in eyepiece focal lengths, be easily adjustable for the users' interpupillary dimension, allow for telescope positioning or orientation about the X, Y and Z axis, adjust to the users' head and eye position, allow for focus mechanism movement and changes in longitudinal position, provide for adequate eyepiece relief and for attachment of other ancillary optical components near the telescopes exit pupil position.

It is the subject of this invention to disclose such an apparatus or device and its mechanisms that are suitable for use with telescopes and similar monocular instruments and to address the deficiencies, inconveniences and quandaries associated with related or prior art appliances.

BRIEF SUMMARY OF THE INVENTION

The present invention relates to an adjustable monocular eye shield for use with telescopes and similar instruments. The invention prevents light from entering the retina of the eye not being used to view an image when installed and properly positioned on a telescope eyepiece or ocular. The invention is normally fitted over an eyepiece barrel and includes a substantially enclosed optical mask proportioned such to block both the medial and peripheral vision in one of the users' eyes and prevent impinging light from entering the retina of the same eye. The monocular eye shield is readily adapted to different users' and types of telescopes. It is adjustable for changes in an eyepiece's focal length, the users' interpupillary dimension, telescope position and orientation about the X, Y and Z Cartesian axis, the users' head and eye position, for focus mechanism movement, is provisioned to allow adequate eyepiece relief and can be positioned to avoid interference with other ancillary optical components at or near the telescope's exit pupil position.

In a more detailed description, the inventive adjustable monocular eye shield machine includes a unique eyepiece adapter bracket that when properly proportioned allows the invention to be fitted over common small telescope eyepiece barrels with nominal diameters of 0.965 inches, 1.250 inches and 2.000 inches and is secured when an eyepiece is installed and fastened onto a telescope. The unique eyepiece adapter bracket in combination with an annular friction washer also allows the invention to be rotated and selectively positioned 360 degrees coaxially about an eyepiece's barrel and selectively positioned for use with either the left or right eyes. The unique eyepiece adapter bracket also includes two orthogonally arranged clearance bores for attaching a multiple axis positioning mechanism as described below. A substantially enclosed optical mask is also included E part of the invention with a cushioned peripheral seal and anatomically contoured medial plate that prevents light from entering the eye not being used to view an image through a telescope eyepiece or ocular. A set of two corresponding pivot clamp nuts, each having a contiguous threaded axial bore and orthogonally arranged radial clearance bore are also included. The pivot clamp nuts are proportioned to receive at opposite ends of their contiguous threaded axial bore both a thumbscrew and screw fastener and through a radial clearance bore the circular cross section of a cantilever arm. As an assemblage these components form the embodiment of a multiple axis positioning mechanism that allows the previously described substantially enclosed optical mask to be rotated and pivoted three hundred and sixty degrees about four different axis and moved and positioned linearly along both the peripheral axis abscissas (X) and the axis of ordinates (Y) of the cantilever arm geometry to suit the requirements of the user. The unique multiple axis positioning mechanisms' utility is also extended by the eyepiece adapter bracket described above that as mentioned provides two apertures or clearance bores for attaching the mechanism to provide additional flexibility in positioning on either of two orthogonally arranged geometric planes the optical mask to avoid interference with other optical components and to suit any positioning requirements the user may have.

These features and others will become obvious to those skilled in the art when taken accordingly from the following description of the construction, combination of parts, arrangement of elements and individual components that will be exemplified in the following-preferred embodiment and the accompanying drawings that illustrate principles of the invention.

BRIEF DESCRIPTION OF THE SEVERAL VIEWS OF THE DRAWING

Concerning the drawings, like reference numbers designate similar or corresponding parts throughout the different views. Also, telescope eyepieces' are normally attached to the structure or body of the telescope at the exit pupil position, the drawings depict or portray this position as an external focusing mechanism or as an eyepiece draw tube although the invention is also provisioned and intended for use with other types of devices and internally focused optical instruments. Also, a telescope structure, body, enclosure or tube as they are known in the art is not shown in the figures to simplify the illustrations, although an allowance and provision have been made for them.

FIG. 3 is a top right perspective view of an adjustable monocular eye shield embodying the present invention illustrating the general form and relationship of the individual parts.

FIG. 4 is a front elevation view of an adjustable monocular eye shield embodying the present invention illustrating parts not revealed in FIG. 3.

FIG. 5 is a right elevation cross-sectional view of an adjustable monocular eye shield embodying the present invention taken along cut-line 5—5 as represented in FIG. 4, illustrating the construction, combination of materials, arrangement of individual parts, clearance bores, threaded bores and fastening devices.

DETAILED DESCRIPTION OF THE INVENTION

Figure 1:
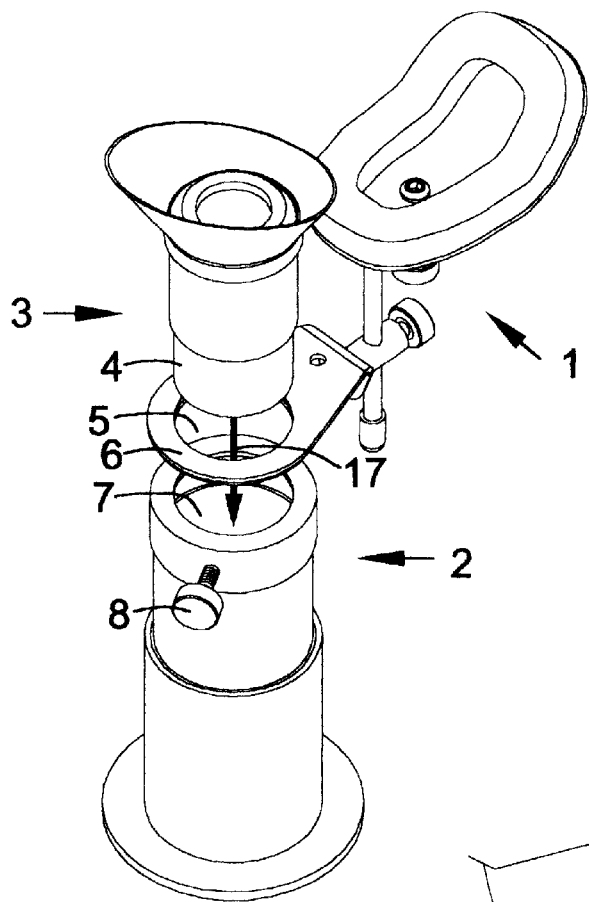
FIG. 1 is a top right perspective view of an adjustable monocular eye shield embodying the present invention illustrating how the invention is installed on a telescope eyepiece and focusing or draw tube mechanism.
Figure 2:
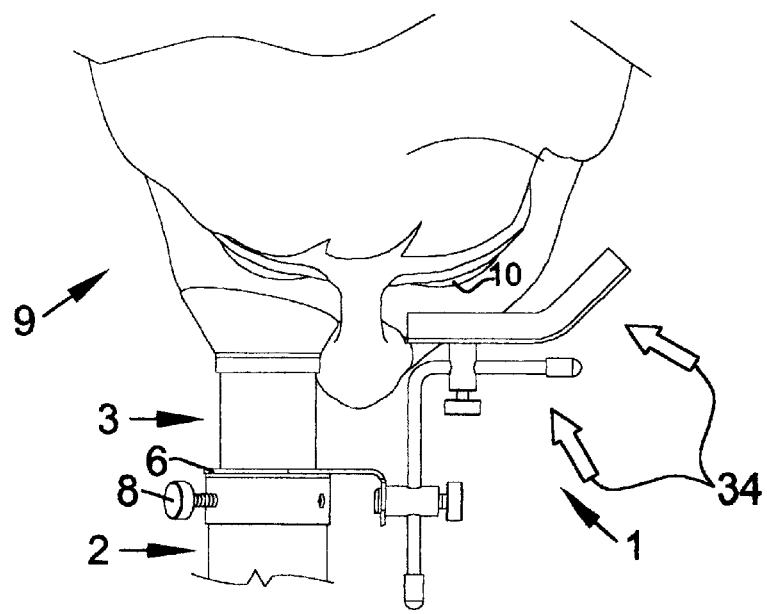
FIG. 2 is a top plan view of an adjustable monocular eye shield embodying the present invention depicting how the device is used to block light to the users' eye.

The rudiments of an adjustable monocular eye shield for telescopes and similar instruments is revealed in FIGS. 1, 2, 3, 4 and 5. FIG. 2 in particular shows embodiments of the invention and its appliances where ambient, off-axis and directed light is being projected toward, blocked, masked or significantly reduced by the inventive device or an allowance has been made for it. It should also be noted that while a telescope eyepiece 3, eyepiece barrel 4, eyepiece lens cell (not enumerated), eyepiece setscrew 8, eyepiece draw tube 2, focusing mechanism (not enumerated) and their appurtenant components are referenced in this specification and in the drawing figures, they are not a not a unique contrivance of this invention, other than in forming the basis for, and providing an environmental and spatial relationship to components of the actual invention.

FIG. 1 illustrates an embodiment of the innovative apparatus that represents how adjustable monocular eye shield assembly 1 (identified as a whole) is attached to a telescope optical system and in particular to an eyepiece drawtube 2 (identified as a whole). As illustrated by the direction of bold arrow 17 the adjustable monocular eye shield assembly 1 is shown positioned and ready to be fitted to and installed between an eyepiece drawtube 2 and eyepiece 3 (identified as a whole). To install the device onto a telescope, eyepiece barrel 4 is first inserted into eyepiece clearance bore 5 in eyepiece adapter bracket 6 and then this assembly is inserted into aperture 7 of eyepiece drawtube 2. Eyepiece adapter bracket 6 and therefore adjustable monocular eye shield assembly 1 are held captive by an interference with the coincident and cooccurring surfaces of both eyepiece drawtube 2, eyepiece 3 and therefore eyepiece barrel 4. The assembly of eyepiece 3 and adjustable monocular eye shield assembly 1 are secured and fastened by tightening eyepiece setscrew 8 on eyepiece drawtube 2 until it contacts the outside periphery of the eyepiece barrel 4. Axial rotation of adjustable monocular eye shield assembly 1 about eyepiece barrel 4 is retarded by common surface friction created with the mating surfaces of eyepiece drawtube 2 and eyepiece 3 that in effect create the rudiments of a friction disc clutch or brake mechanism. The amount of static friction created by eyepiece drawtube 2 and eyepiece 3 and by their common surfaces that give interference to eyepiece adapter bracket 6 is based on two factors. The first is the pressure or mating force applied during their union and maintained while tightening eyepiece setscrew 8 on eyepiece drawtube 2. The second is the composite and relative coefficients' of static and sliding friction of the materials that are in direct contact with eyepiece adapter bracket 6. A table listing the coefficients of static and sliding friction for different types of machine elements and materials can be found in "Marks Mechanical Engineers Handbook," 8$^{th}$ Edition, 1978 (McGraw-Hill, Inc.), Section 3, Page 26.

FIG. 2 diagrammatically illustrates a second embodiment of the adjustable monocular eye shield assembly 1 after it has been installed between a eyepiece drawtube 2 and eyepiece 3. Visible light represented by bold arrows 34 is being directed toward the periphery of the adjustable monocular eye shield assembly 1 in either a direct or random fashion. The adjustable monocular eye shield assembly 1 has been placed in a position if front of the users head 9 (identified as a whole) and left eye 10 and the impinging light energy and blocks the light due to the opaque nature and optical qualities of materials used to construct the inventive device. Referring to FIGS. 1 and 2, it should be noted the adjustable monocular eye shield assembly 1 can also be rotated coaxially about the eyepiece barrel 4 and repositioned to shield the right eye (not shown).

Referring again to FIG. 2; experiments conducted with the inventive adjustable monocular eye shield assembly 1 proved that when positioned in front of either eye and when used with a telescope ocular or eyepiece, it enabled both eyes to be kept open while preventing or reducing the light energy that entered the eye not positioned over the eyepiece. It was also found that over long periods when both eyes are allowed to remain open it prevented or reduced muscle fatigue, discomfort in surrounding facial tissue, reduced eye strain and increased efficiency. Furthermore it was discovered that adjustable monocular eye shield assembly 1 can be positioned to satisfy the various anatomical features of random subjects enlisted for testing of the innovative device. In addition the apparatus was also fitted to several types of reflecting, refracting and catadioptric telescopes and proved capable of being properly positioned for optimum optical efficiency; despite the various eyepiece reliefs and type of eyepiece tube, focusing mechanism or other accessory onto which is was installed.

FIGS. 3, 4 and 5 diagrammatically illustrate a third embodiment of the inventive device. As shown in the illustrations optical mask assembly 11 (identified as a whole) consists of two parts, a peripheral seal 12 and medial plate 13. Peripheral seal 12 is secured to medial plate 13 by an adhesive film 28. In practice the peripheral seal 12 would be constructed from a closed or open cell foam rubber, rubber or other flexible and pliable material. Peripheral seal 12 while blocking light also provides a cushion when placed in contact with the facial area surrounding the eye. An important concern of peripheral seal 12 that should not be disregarded is that it must also provide adequate eye relief to keep the user's eye, eyelids and eye lashes from contacting medial plate 13 when used as mask. This would create a discomfort and should be avoided. A minimum eye relief or the dimension for the height of peripheral seal 12 from the mating surface of medial plate 13 that generally proves adequate is 0.375 inches or greater. The drawings suggest and depict peripheral seal 12 as a component with square inches cross section. During development of the invention it was also determined that peripheral seal 12 can also have a variety of other cross-sectional forms without affecting its intended function. Peripheral seal 12 if it were considered in cross-section, an extruded material can be any practical geometric construct or shape such as circular, square, triangular, rectangular, prismatic, elliptical, octagonal, hexagonal or any combination of these forms that provide both a closed cross section or geometry and a common surface for attachment to medial plate 13.

Referring again to FIGS. 3, 4 and 5; medial plate 13 can be fabricated from any rigid or semi-rigid and optically opaque material. Suitable materials would be nonferrous or ferrous metals such as aluminum or steel although a suitable durable plastic, fiber composite, phenolic, rigid paper or engineering laminate can also be used. The material employed for the medial plate 13 should preferably be as lightweight as possible and the surface to which peripheral seal 12 is attached or nearest the user's eye should have a finish preferably colored flat black to absorb as much light energy as possible and a broken, matted or grain-textured surface that is not subject to reflections.

Figure 9:
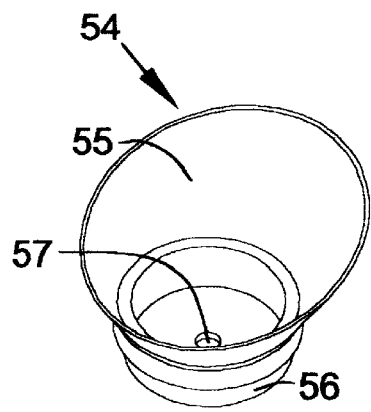
FIG. 9 is a top right perspective view of a modified optical mask assembly and an embodiment of the present invention.
Figure 10:
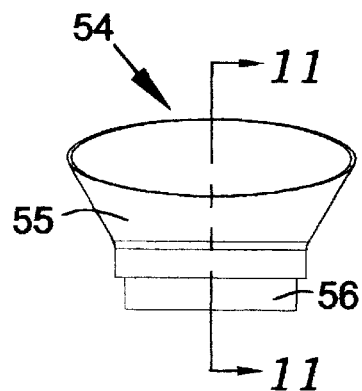
FIG. 10 is a front elevation view of a modified optical mask assembly and an embodiment of the present invention.
Figure 11:
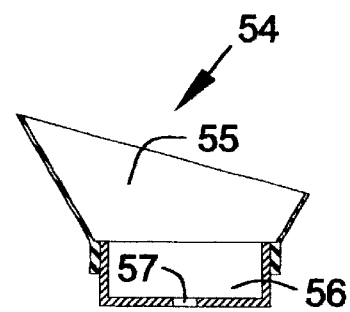
FIG. 11 is a left elevation cross-sectional view of a modified optical mask assembly and an embodiment of the present invention taken along cut-line 11—11 as represented in FIG. 10, illustrating the construction, combination of materials and arrangement of individual parts.

FIGS. 9, 10 and 11 show in a second embodiment a modified optical mask assembly 54 (identified as a whole). The drawings are intended to illustrate one the various modified forms optical mask assembly 11 (FIGS. 1, 2, 3, 4 and 5) can assume without affecting its intended function. As shown in the drawing, modified eye shield assembly 54 appertains a peripheral seal 55 portion and a medial cup 56 portion. Peripheral seal 55 would be normally constructed from a resilient material such as rubber and is attached to medial cup 56 by both an interference and the common surface friction between their mating surfaces. A clearance bore 57 in medial cup 56 portion is provided to allow the device to be attached to a pivot clamp nut such as upper pivot clamp nut 15 (FIGS. 3, 4 and 5) using a simple screw type fastening. If modified optical mask assembly 54 were to be a mass-produced item, its individual components could easily be combined into one part and the entire assembly molded from rubber or a similar material.

Referring again to FIGS. 3, 4 and 5; The peripheral geometry or uniform cross sectional geometry of angled cantilever arm 14 if it were considered an extruded or drawn part is proportioned such as to allow passage through both clearance bore 31 in upper pivot clamp nut 15 and clearance bore 33 in lower pivot clamp nut 16. The preferred uniform cross sectional shape for angled cantilever arm 14 and for this invention is circular because this shape enables it to be both rotated 360-degrees and positioned longitudinally along its coincident axis with respect to clearance bore 33 in lower pivot clamp nut 16. The uniform cross section and 90-degree bend angle 36 placed longitudinally along the periphery of angled cantilever arm 14 also enables upper pivot clamp nut 15 to be both rotated 360-degrees and positioned longitudinally its coincident axis about clearance bore 31. Upper pivot clamp nut 15 and lower pivot clamp nut 16 are represented in the drawings as being cylindrical or having a circular cross section although this shape is not critical to their intended function, they can very easily have a square or other convenient cross-section shape. Also upper pivot clamp nut 15 and lower pivot clamp nut 16 are mentioned as having contiguous threaded axial bores, this to is not critical to their intended function as these bores can just as easily be individually threaded and non-contiguous as well as being located off-axis. The consideration in using an off-axis threaded bore or bores that might be objectionable, is this would cause any components mounted to the pivot nut clamps to rotate eccentrically instead of axially about their longitudinal centerline.

Figure 6:
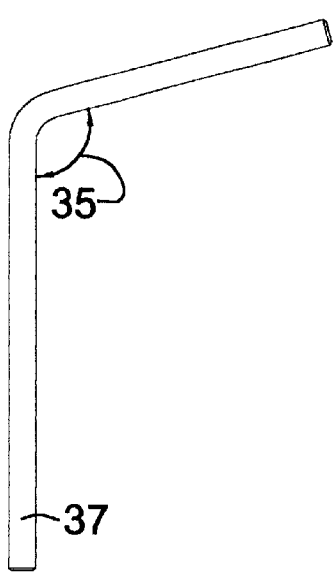
FIG. 6 is a right elevation view of an obtuse cantilever arm and an embodiment of the present invention.

Referring to FIG. 6, and in an improved embodiment of a angled cantilever arm 14 (FIG. 3, 4 and 5) it was found that by altering the longitudinal bend angle or curved portion to an angle between 105 and 120 degrees as represented by obtuse angle 35 of obtuse cantilever arm 37 it allowed optical mask assembly 11 (FIG. 3, 4 and 5) when fitted with to device too more adeptly fit the anatomical and facial contours of the average user. Both angled cantilever arm 14 (FIG. 3, 4 and 5) and obtuse cantilever arm 37 (FIG. 6) can be made from any durable material such as a plastic, fiber composite, a ferrous or nonferrous metal.

Figure 7:
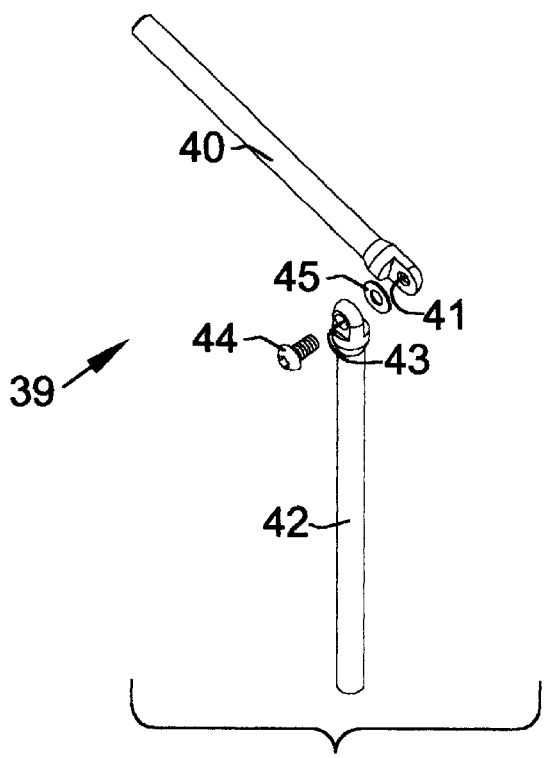
FIG. 7 is an top left exploded perspective view of an of a hinged cantilever arm assembly and an embodiment of the present invention.

Referring to FIG. 7 in an another improved embodiment, a hinged cantilever arm assembly 39 (identified as a whole) is revealed. It was found that by dividing improved obtuse cantilever arm 37 (FIG. 6) into separate hinge arms as depicted by upper hinge arm 40 and lower hinge arm 42, and by also flattening the ends of the these arms into hinge leafs and providing a pivot bore, it was possible to provision the basic cantilever arm with a hinge pivot mechanism that allows the arms to be rotated 180 degrees about the axis of threaded fastener 44 that is normally fitted through clearance bore 43 and proportioned to engage threaded bore 41 when the device is assembled. This allows the user to position the arm to any desired angle by loosening threaded fastener 44 and allows a more ergonomic fit. An additional component required to augment this modification is fiber friction washer 45 that is used to provide additional friction between the mating surfaces of upper hinge arm 40 and lower hinge arm 42 to prevent the arms from rotating after threaded fastener 44 is tightened to secure their union. Hinged cantilever arm assembly 39 and its individual components with the exception of fiber friction washer 45 can be made from any durable material such as a plastic, fiber composite, or a ferrous or nonferrous metal.

Figure 8:
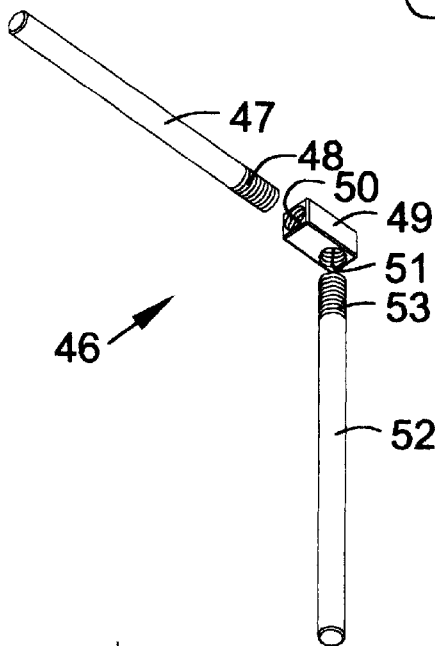
FIG. 8 is an top left exploded perspective view of an elbow cantilever arm assembly and an embodiment of the present invention.

Referring to FIG. 8 in an exploded assembly view, and in another improved embodiment, an elbow cantilever arm assembly 46 (identified as a whole) is revealed. Again it was found that by dividing improved obtuse cantilever arm 37 (FIG. 6) into separate arms as is depicted by upper cantilever arm 47 and lower cantilever arm 52, and that by threading the end portions of the arms as depicted by threads 48 of upper cantilever arm 47 and threads 53 of lower cantilever arm 52 they would be fitted to a angled union 49. Threads 48 of upper cantilever arm 47 and threads 53 of lower cantilever arm 52 are proportioned to engage threaded bore 50 and threaded bore 51 of angled union 49 respectively. This allows the user to easily interchange either of the arms with arms of different lengths to suit their positioning and mounting requirements.

Referring to FIGS. 1, 3 and 5; the diametric proportions of clearance bore 5 in eyepiece adapter bracket 6 is of consideration and its diametric proportions must satisfy two conditions. First, eyepiece clearance bore 5 must be large enough to allow an eyepiece barrel 4 to pass through the opening and second it should be small enough to give interference with the lens cell portion of the eyepiece it is to fit. Small telescope eyepieces' typically have nominal barrel diameters of 0.965 inches, 1.250 inches and 2.000 inches and it is common practice among eyepiece manufacturers too undersize the diameter of eyepiece barrels or the adapter portion of the eyepiece by 0.003 to 0.005 inches. To select the proper diameter for eyepiece clearance bore 5 in eyepiece adapter bracket 6 a lens size must first be selected that matches with a standard eyepiece size. As an example, if the outside diameter of a 1.250 inch eyepiece lens cell measures 1.270 inches then the maximum diameter of eyepiece clearance bore 5 in eyepiece adapter bracket 6 must be less than this amount. Also, as previously mentioned, for a nominal eyepiece barrel diameter of 1.250 inches, the actual eyepiece barrel diameter is typically 1.245 to 1.247 inches. In practice a tolerance of 0.008 to 0.011 inches would be added to the true eyepiece barrel diameter of 1.245 to 1.247 inches to allow for both a machining and thermal expansion. The dimension then for eyepiece clearance bore 5 in eyepiece adapter bracket 6 would be 1.253 to 1.258 inches in diameter to allow for passage of the eyepiece barrel 4 but still give an interference of 0.012 to 0.017 inches with the outer eyepiece lens cell periphery or diameter of 1.270 inches.

Referring again to FIGS. 3 and 5; also of concern is the linear dimension from the center of eyepiece clearance bore 5 to the inside portion of face 38 located on eyepiece adapter bracket 6 where it is formed or bent for attachment of lower pivot clamp nut 16. This dimension must be selected to provide adequate clearance from the external geometry of the largest device eyepiece adapter bracket 6 would be fitted too. As an example, if eyepiece adapter bracket 6 is to be mounted on a draw tube mechanism designed to accept a nominal 1.250 inch eyepiece that has a tubular shape and outside diameter of 3.500 inches. This would mean that the distance from the center of eyepiece clearance bore 5 and inside face 38 on eyepiece adapter bracket 6 would need to be greater than the 1.750 inches or the radius of the focusing mechanism plus an allowance for clearance of the head of screw fastener 19 fitted to clearance bore 27 in eyepiece adapter bracket 6. If the head height of screw fastener 19 was 0.125 inches, the total linear dimension should be greater than 1.875 inches plus an allowance for machining tolerance and thermal expansion.

Referring again to FIGS. 3, 4 and 5; while the basic geometry of the eyepiece adapter bracket 6 or peripheral shape is not critical to its intended function, it should have at least one mounting surface formed or placed as to be orthogonal arranged to the axis of the eyepiece clearance bore 5. The actual peripheral form can any common geometric shape such as a circle, square, rectangle, prism, ellipse, octagon, hexagon or any practical combination of these. Its geometry though should account for and allow access to any fastenings or controls that can be on other components underneath or hidden from the user if it were proportioned incorrectly. Although the eyepiece adapter bracket 6 should have at least one surface formed perpendicular or orthogonal to eyepiece clearance bore 5 to provision clearance bore 27, an additional mounting aperture such as clearance bore 25 would allow added utility in attaching additional mechanisms or other appliances to the device.

Referring again to FIGS. 3, 4 and 5; while the materials employed to construct the upper pivot clamp nut 15 and lower pivot clamp nut 16 and eyepiece adapter bracket 6 are not critical they should be durable, easily machined, molded or formed. Suitable materials would be a nonferrous or ferrous metal such as aluminum or steel although a suitable plastic, fiber composite or laminate can also be used.

Figure 12:
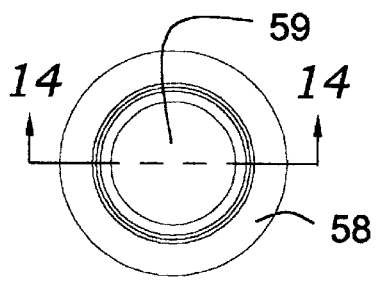
FIG. 12 is a top plan view of an eyepiece bore adapter and an embodiment of the present invention.
Figure 13:
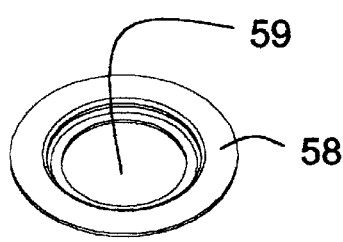
FIG. 13 is a top right perspective view of a eyepiece bore adapter and an embodiment of the present invention illustrating its basic form.
Figure 14:
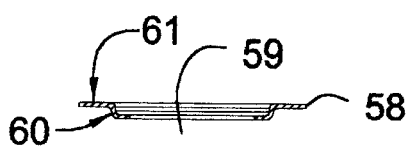
FIG. 14 is a front elevation cross-sectional view of an eyepiece bore adapter and an embodiment of the present invention taken along cut-line 14—14 as represented in FIG. 12, illustrating various construction features.

Referring to FIGS. 12, 13 and 14, an apparatus that provides additional utility when properly fitted to the invention is eyepiece bore adapter 58. It was found that if eyepiece through bore 5 (FIGS. 3, 4, and 5) in eyepiece adapter bracket 6 (FIGS. 3, 4, and 5) is proportioned such as to fit a nominal 2.000 or 1.250 inches diameter eyepiece barrel 4 (FIG. 1), that a bore reducer or adapter can easily be fashioned to fit eyepiece adapter bracket 6 (FIGS. 3, 4 and 5) to smaller diameter eyepiece barrels such as 1.250 or 0.965 inches in diameter, respectively. In a more detailed explanation of the construction, When properly proportioned annular face 60 should be sized large enough to prevent eyepiece bore adapter 58 from passing through eyepiece through bore 5 (FIGS. 3, 4, and 5) in eyepiece adapter bracket 6 (FIGS. 3, 4, and 5). Also inclined annular face 61 should be diametrically proportioned to abut with the cylindrical side walls (not shown) of eyepiece through bore 5 (FIGS. 3, 4, and 5). The diameter of eyepiece through bore 59 should be proportioned such to the nominal diameter of the eyepiece barrel it is to be fitted too.

Referring to FIG. 14, important is the overall height or thickness of eyepiece bore adapter 58 as it is shown in the drawing. Referring to FIG. 5, the total thickness of eyepiece bore adapter 58 should be less than the composite thickness of eyepiece adapter bracket 5 plus the thickness of friction washer 24. If it is made too thick then this will prevent friction washer 24 from being properly compressed and seated when the invention is installed and allow the invention to rotate.

Referring again to FIGS. 12, 13 and 14, eyepiece bore adapter 58 as depicted in the drawings can easily be fashioned as a stamped, molded or laminated part. Suitable materials for construction would be a ferrous or nonferrous metal such as aluminum or steel although a suitable plastic or fiber composite can also be used.

A detailed description of the mechanisms employed in FIGS. 1, 2, 3, 4 and 5 follow: Optical mask assembly 11 (identified as a whole) consists of peripheral seal 12 portion and medial plate 13 portion. Peripheral seal portion 12 as mentioned is secured to medial plate 13 portion by an adhesive film 28. Optical mask assembly 11 is secured by a passing screw fastener 18 through clearance bore 29 in medial plate 13 and threading it into threaded bore 30 in upper pivot clamp nut 15. Screw fastener 18 when loosened allows optical mask assembly 11 to be rotated 360 degrees and positioned to suit the users' requirements. Angled cantilever arm 14 is fitted through clearance bore 31 in upper pivot clamp nut 15 and secured by a clamping force when thumbscrew fastener 21 is tightened. When thumbscrew fastener 21 is loosened, it allows upper pivot clamp nut 15 and therefore optical mask assembly 11 to be rotated 360 degrees about angled cantilever arm 14 and move longitudinally to suit the users' requirements. Angled cantilever arm 14 is also fitted through clearance bore 33 in lower pivot clamp nut 16 and is secured by thumbscrew fastener 20. When thumbscrew fastener 20 is loosened, it allows angled cantilever arm 14 and therefore optical mask assembly 11 to be rotated 360 degrees about the coincident axis of angled cantilever arm 14 and be positioned longitudinally to suit the users' requirements. Lower pivot clamp nut 16 is secured by screw fastener 19 through clearance bore 27 in eyepiece adapter bracket 6. When screw fastener 19 is loosened, it allows pivot clamp nut 16 to be completely rotated 360 degrees about it axises to suit the user's requirements.

Referring to FIG. 5, annular friction washer 24 is fastened to the eyepiece adapter bracket 6 by an adhesive film 26 applied to their common mating surfaces. Suitable materials to construct annular friction washer 24 are low durometer rubber, closed cell neoprene, cork and fiber composite. It was found through experimentation that all are suited to its intended function of retarding rotation of eyepiece adapter bracket 6 when installed on a telescope eyepiece (not shown). Safety cap 22 and safety cap 23 are proportioned to slide over the ends of angled cantilever arm 14 and are secured through common surface friction. Safety cap 22 and safety cap 23 can be constructed of vinyl plastic and are included to prevent any sharp edges on the ends of cantilever arm 14 from being exposed. Their friction fit also allows them to be easily removed so that the angled cantilever arm 14 can be interchanged with other cantilever arms having different lengths and geometry for mounting other accessory components.

Referring to FIG. 1 and 2 the combined utility of the parts employed to construct the mechanism allows it to be properly positioned with respect to the various anatomical features and inter-pupillary distances of persons using the eye shield and the telescope onto which it is installed. The invention when properly installed on a telescope eyepiece 3 can also be rotated 360 degrees rotated about the axis of eyepiece clearance bore 5 in eyepiece adapter bracket 6. This rotation allows the invention be positioned for use with either the users left eye 10 or a right eye (not shown).

Referring to FIG. 3, 4 and 5, it will also be obvious to those skilled in the art that optical mask assembly 11 can easily be constructed from a plastic or similar material that would benefit from injection molding or a similar process. This would simplify manufacture and might provide a significant weight reduction over metallic materials that is often a concern when trying to balance a telescope on its mounting. Also optical mask assembly 11 can easily be embodied as single part or as a whole and molded as one piece from a natural or synthetic rubber or suitable soft plastic. It should be noted that the utility of the eyepiece adapter bracket 6, angled cantilever arm 14, upper pivot clamp nut 15 and lower pivot clamp nut 16 and the fastenings would easily allow other types of components or appliances to also be mounted using the threaded bore 30 in upper pivot clamp nut 15 as an attachment receptacle and that multiple appliances can also be attached to angled cantilever arm 14 if additional pivot clamp nuts such as pivot clamp nut 15 are used. Such devices with an appropriate adapter mechanism include prisms, lens, eyepiece projection screens and lightweight film or video cameras.

It should be understood that while the invention has been described in detail with the preferred embodiments, the specification and drawings are illustrative but not a limitation of the present invention and that other embodiments within the context, spirit and scope of the invention will suggest themselves to those skilled in the art. Having thus described the invention, what is believed to be new and novel and sought for protection granted by Letters Patent of the United States heron be limited only by the definition contained in the appended claims and equivalents thereof, privilege claimed as follows:

What I claim as my invention is:

1. An adjustable monocular eye shield for telescopes and similar instruments that is coaxially attached too, on, or between and normally used with an eyepiece barrel, eyepiece, eyepiece holder, draw tube or eyepiece focusing mechanism; said apparatus comprising:

(a) an eyepiece adapter bracket provisioned and proportioned such with an eyepiece clearance bore to allow said eyepiece adapter bracket to be fitted about said eyepiece barrel having a nominal diameter of 0.965 inches, 1.250 inches or 2.000 inches, said eyepiece adapter bracket being inclusive of at least one additional clearance bore arranged orthogonally to said eyepiece clearance bore, said clearance bore proportioned to accept a screw type fastening or other device for attaching a multiple axis positioning mechanism and said eyepiece adapter bracket also appertaining a properly proportioned annular friction washer disposed about said eyepiece clearance bore, (b) a substantially closed optical mask assembly appertaining a peripheral seal portion, a medial plate portion and a fastening clearance bore, said substantially closed optical mask assembly also being proportioned such that it blocks or impedes the path of incident light energy to the users' retina, said substantially closed optical mask assembly including mechanisms for occluding both the peripheral and medial vision in one eye, said peripheral seal portion being fashioned to be substantially enclosed and cushioned and said medial plate portion being anatomically contoured, (c) a cantilever arm for supporting and adjusting the position of said optical mask assembly in relation to said eyepiece adapter bracket, said cantilever arm being constructed as one or more component parts to form a whole, said cantilever arm having a predetermined cross-sectional shape and said cantilever arm being inclusive either a longitudinal bend, or curved portion, or angled union or hinge pivot mechanism appropriately disposed along the length of its periphery, (d) a plurality of pivot clamp nuts, said pivot nut clamps having a contiguous threaded axial bore and orthogonally arranged radial clearance bore, said pivot clamp nuts proportioned such to receive at oppositely disposed ends of said contiguous threaded axial bore, screw type fastenings and through said radial clearance bore the predetermined cross-section of said cantilever arm, (e) a plurality of said screw type fastenings, properly proportioned to be fitted through said clearance bores to engage said threaded bores for securing and connecting said eyepiece adapter bracket, said substantially closed optical mask assembly, said cantilever arm and said pivot clamp nuts mutually, to adjoin and form them as a whole.

2. Apparatus as in claim 1, where said pivot clamp nuts are embodied and arranged as to have individually threaded noncontiguous bores at oppositely disposed ends.

3. Apparatus as in claim 1, where said pivot clamp nuts are embodied and arranged as to have individually threaded noncontiguous bores at oppositely disposed ends.

4. Apparatus as in claim 1, where in said medial plate portion and said peripheral seal portion of said substantially closed optical mask assembly are embodied as a single part and as a whole.

5. Apparatus as in claim 1, where said hinge pivot mechanism of said cantilever arm is embodied and arranged as a separate part.

6. Apparatus as in claim 1, where said hinge pivot mechanism of said cantilever arm is embodied and distributed as separate parts to form a whole.

7. Apparatus as in claim 1, where an eyepiece bore adapter as a separate embodiment is fitted to said eyepiece adapter bracket.

* * * * *